S. I. ROSE.
COMPOSITION FUEL.
APPLICATION FILED MAY 1, 1916.

1,270,664.

Patented June 25, 1918.

STRAWBOARD IMPREGNATED WITH SODIUM NITRATE AND SODIUM CHLORIDE

STRAWBOARD IMPREGNATED WITH SODIUM NITRATE AND SODIUM CHLORIDE

WITNESS
Geo. E. Kricker.

INVENTOR
S. I. ROSE.
BY
Fisher & Willett
ATTORNEYS

UNITED STATES PATENT OFFICE.

SAMUEL I. ROSE, OF CLEVELAND, OHIO, ASSIGNOR TO THE MARVEL ACCESSORIES MANUFACTURING COMPANY, OF CLEVELAND, OHIO, A CORPORATION.

COMPOSITION FUEL.

1,270,664.      Specification of Letters Patent.      Patented June 25, 1918.

Application filed May 1, 1916. Serial No. 94,545.

*To all whom it may concern:*

Be it known that I, SAMUEL I. ROSE, a citizen of the United States, residing at Cleveland, in the county of Cuyahoga and State of Ohio, have invented certain new and useful Improvements in Composition Fuel, of which the following is a specification.

The invention consists of a chemically-treated combustible substance adapted to be used as a fuel and heating agent, particularly in portable devices having an open fire box or chamber in which the fuel may be placed and consumed and the heat conveyed by radiation through the walls thereof. Preferably, the fuel is made in the form of a cake or disk, either round or angular sided and of any desired size according to its place of use, and the fuel possesses the property of being readily ignited by a match and of imparting a predetermined degree of heat by quick combustion without an objectionable amount of flame, smoke, smell or gases.

Figure 1:
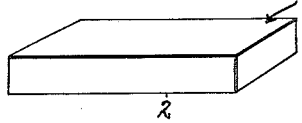
Figure 2:
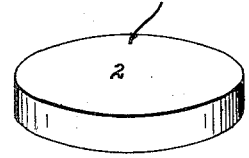
Figure 3:
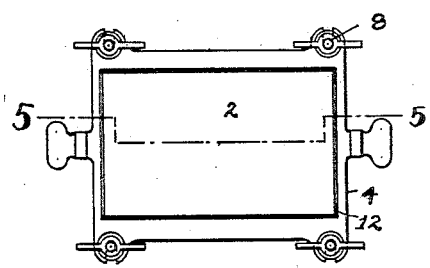
Figure 4:
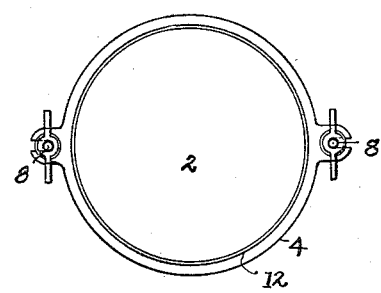
Figure 5:
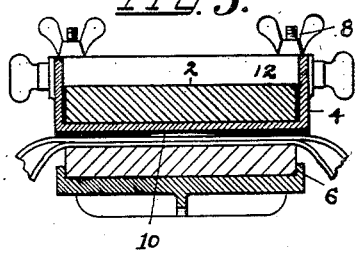
Figure 6:
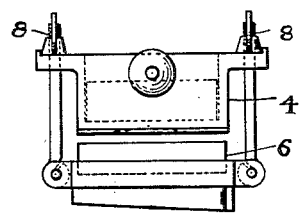

In the accompanying drawings, Figure 1 is a perspective view of a rectangular cake of my improved fuel, and Fig. 2 a perspective view of a round disk of the same substance. Fig. 3 is a plan view of a rubber vulcanizing device adapted to use the fuel in the form shown in Fig. 1, and Fig. 4 is a plan view of a circular vulcanizer adapted to use the round combustible disk. Figs. 5 and 6 are sectional and side views respectively, of the vulcanizing device shown in Fig. 3, showing the fuel in place in the combustion chamber thereof.

The fuel consists of a flat cake or disk 2 made of straw-board, card-board, or equivalent combustible material of any suitable thickness adapted to provide a body or base which may be impregnated throughout with a chemical solution to promote combustion and hot embers. This solution consists of four parts of nitrate of sodium, one part of chlorid of sodium, and eight parts of water. Following thorough saturation of the cakes or disks in this solution, the excess solution is removed by subjecting the cakes or disks to pressure. Then the pressed cakes are placed in pans and dried in a suitable oven. The dried and compressed product is tough and stiff and not easily broken; is readily ignited by a match, and burns quickly if provided with sufficient air, leaving a body of glowing ashes or embers to impart heat after the flare.

Obviously this combustible may be used wherever it may be found to have utility. For example, it may be employed as a heating agent in the vulcanizing apparatus shown in Figs. 3 to 6, a device known to me, comprising a vulcanizing body 4 and a base member 6 detachably connected thereto by clamping screws 8. The rubber article to be vulcanized is placed between the base 6 and the bottom face of the body 4, while the vulcanizable material for effecting the repairs is centered at the shallow concavity 10 in said bottom face beneath the center of the heating element 2 which rests in the open shallow chamber 12 in body 4. The chlorid of sodium is employed to slow combustion and more or less may be used as compared with the proportion stated.

What I claim is:

1. A composition fuel consisting solely of a carboniferous material impregnated with nitrate of sodium and chlorid of sodium.

2. A composition fuel consisting wholly of a compressed cake of straw-board impregnated with nitrate of sodium and a small percentage of chlorid of sodium.

3. A composition fuel consisting of a compressed cake of straw-board treated with a solution of four parts of nitrate of sodium and one part of chlorid of sodium and eight parts of water.

In testimony whereof I affix my signature in presence of two witnesses.

SAMUEL I. ROSE.

Witnesses:
     EDWIN J. THALMAN,
     GEO. E. KRICKER.